United States Patent
Scheiner et al.

(10) Patent No.: US 9,477,454 B2
(45) Date of Patent: Oct. 25, 2016

(54) AUTOMATED SOFTWARE DEPLOYMENT

(71) Applicant: CA, Inc., Islandia, NY (US)

(72) Inventors: Uri Scheiner, Haifa (IL); Yaron Avisror, Kfar Saba (IL)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/621,114

(22) Filed: Feb. 12, 2015

(65) Prior Publication Data

US 2016/0239280 A1    Aug. 18, 2016

(51) Int. Cl.
*G06F 9/44*    (2006.01)
*G06F 9/445*    (2006.01)

(52) U.S. Cl.
CPC . *G06F 8/60* (2013.01); *G06F 8/61* (2013.01); *G06F 8/65* (2013.01)

(58) Field of Classification Search
CPC .............. G06F 8/65; G06F 8/60; G06F 8/61
USPC ........................................................ 717/172
See application file for complete search history.

(56) References Cited

U.S. PATENT DOCUMENTS

| | | | |
|---|---|---|---|
| 5,576,965 A | 11/1996 | Akasaka et al. | |
| 6,122,627 A | 9/2000 | Carey et al. | |
| 6,134,540 A | 10/2000 | Carey et al. | |
| 6,810,368 B1 | 10/2004 | Pednault | |
| 6,879,946 B2 | 4/2005 | Rong et al. | |
| 6,883,162 B2 | 4/2005 | Jackson et al. | |
| 6,957,199 B1 | 10/2005 | Fisher | |
| 7,376,549 B2 | 5/2008 | Horikawa | |
| 7,437,710 B2 | 10/2008 | Bau et al. | |
| 7,487,508 B2 | 2/2009 | Fu et al. | |
| 7,539,980 B1 | 5/2009 | Bailey et al. | |
| 7,552,036 B2 | 6/2009 | Oslake et al. | |
| 7,676,538 B2 | 3/2010 | Potter et al. | |
| 7,783,613 B2 | 8/2010 | Gupta et al. | |
| 7,805,496 B2 | 9/2010 | Aiber et al. | |
| 7,865,888 B1 * | 1/2011 | Qureshi ................. | G06N 5/048 717/168 |
| 7,870,550 B1 * | 1/2011 | Qureshi ................. | G06N 5/048 717/168 |
| 7,873,594 B2 | 1/2011 | Harada et al. | |
| 7,966,183 B1 | 6/2011 | Yao et al. | |
| 7,996,814 B1 * | 8/2011 | Qureshi ................. | G06N 5/048 717/172 |
| 8,001,527 B1 * | 8/2011 | Qureshi ................. | G06N 5/048 717/172 |

(Continued)

OTHER PUBLICATIONS

Hall, "Agent-based Software Configuration and Deployment", 1999, University of Colorado.*

(Continued)

*Primary Examiner* — Anna Deng
*Assistant Examiner* — Junchun Wu
(74) *Attorney, Agent, or Firm* — Patent Capital Group

(57) ABSTRACT

Particular deployment logic is selected that describes a plurality of steps in a type of software deployment. Release data is identified that defines a selection of a set of software artifacts to be deployed in a particular deployment. Further, environmental data is selected that describes configuration of a target system for the particular deployment. First associations are determined, using data processing apparatus, between steps in the plurality of steps and software artifacts in the set of software artifacts. Second associations are determined between steps in the plurality of steps and configuration information of the target system used in the respective steps. The artifacts are automatically deployed on the target system, using one or more data processing apparatus, based on the first and second associations.

18 Claims, 17 Drawing Sheets

(56) References Cited

U.S. PATENT DOCUMENTS

| | | | |
|---|---|---|---|
| 8,037,453 B1* | 10/2011 | Zawadzki | 717/123 |
| 8,060,864 B1 | 11/2011 | Michelsen | |
| 8,112,262 B1 | 2/2012 | Michelsen | |
| 8,225,310 B1* | 7/2012 | Robertson et al. | 717/177 |
| 8,538,740 B2 | 9/2013 | Kumar et al. | |
| 8,776,048 B2 | 7/2014 | Abuelsaad et al. | |
| 8,898,681 B1 | 11/2014 | Acheff et al. | |
| 9,323,645 B2 | 4/2016 | Michelsen | |
| 2002/0010781 A1 | 1/2002 | Tuatini | |
| 2003/0055670 A1 | 3/2003 | Kryskow et al. | |
| 2003/0217162 A1 | 11/2003 | Fu et al. | |
| 2004/0060035 A1* | 3/2004 | Ustaris | G06F 8/71 717/174 |
| 2004/0078782 A1 | 4/2004 | Clement et al. | |
| 2004/0128259 A1 | 7/2004 | Blakeley et al. | |
| 2004/0162778 A1 | 8/2004 | Kramer et al. | |
| 2004/0230674 A1 | 11/2004 | Pourheidari et al. | |
| 2005/0027648 A1 | 2/2005 | Knowles et al. | |
| 2005/0063335 A1 | 3/2005 | Shenfield et al. | |
| 2005/0283759 A1* | 12/2005 | Peteanu et al. | 717/170 |
| 2005/0289231 A1 | 12/2005 | Harada et al. | |
| 2006/0041643 A1* | 2/2006 | Fanshier | G06F 8/61 709/220 |
| 2006/0075399 A1* | 4/2006 | Loh | G06F 8/65 717/174 |
| 2006/0101462 A1* | 5/2006 | Spears | G06F 8/61 717/177 |
| 2006/0224375 A1 | 10/2006 | Barnett et al. | |
| 2006/0235675 A1 | 10/2006 | Oslake et al. | |
| 2007/0006177 A1 | 1/2007 | Aiber et al. | |
| 2007/0073682 A1 | 3/2007 | Adar et al. | |
| 2007/0169003 A1 | 7/2007 | Branda et al. | |
| 2007/0261035 A1 | 11/2007 | Duneau | |
| 2007/0277158 A1 | 11/2007 | Li et al. | |
| 2008/0010074 A1 | 1/2008 | Brunswig et al. | |
| 2008/0120129 A1 | 5/2008 | Seubert et al. | |
| 2008/0127093 A1 | 5/2008 | Fernandez-Ivern et al. | |
| 2009/0064149 A1 | 3/2009 | Singh et al. | |
| 2009/0094684 A1 | 4/2009 | Chinnusamy et al. | |
| 2009/0119301 A1 | 5/2009 | Cherkasova et al. | |
| 2009/0187534 A1 | 7/2009 | Broll et al. | |
| 2009/0234710 A1 | 9/2009 | Hassine et al. | |
| 2009/0282403 A1 | 11/2009 | Poole et al. | |
| 2009/0298458 A1 | 12/2009 | Bakker et al. | |
| 2010/0318974 A1 | 12/2010 | Hrastnik et al. | |
| 2011/0194858 A1 | 8/2011 | Rotenstein et al. | |
| 2012/0059868 A1 | 3/2012 | Buckl et al. | |
| 2012/0066674 A1* | 3/2012 | Xie | 717/174 |
| 2012/0110567 A1* | 5/2012 | Lyons | G06F 8/61 717/177 |
| 2012/0117560 A1* | 5/2012 | Vorthmann | G06F 8/60 717/177 |
| 2013/0232464 A1* | 9/2013 | Jacquin et al. | 717/104 |
| 2013/0332900 A1* | 12/2013 | Berg | G06F 8/71 717/121 |
| 2014/0130036 A1* | 5/2014 | Gurikar | G06F 8/61 717/176 |
| 2014/0223418 A1 | 8/2014 | Michelsen et al. | |
| 2015/0205699 A1 | 7/2015 | Michelsen | |
| 2015/0205700 A1 | 7/2015 | Michelsen | |
| 2015/0205701 A1 | 7/2015 | Michelsen | |
| 2015/0205702 A1 | 7/2015 | Michelsen | |
| 2015/0205703 A1 | 7/2015 | Michelsen | |
| 2015/0205708 A1 | 7/2015 | Michelsen | |
| 2015/0205712 A1 | 7/2015 | Michelsen | |
| 2015/0205713 A1 | 7/2015 | Michelsen | |

OTHER PUBLICATIONS

Arshad et al., "Deployment and dynamic reconfiguration planning for distributed software systems", May 17, 2007, Springer Science Business Media, LLC.*

Nesbitt, "Integration and Deployment Techniques in Combination with Development Methodologies", 2009, Regis University.*

Wikipedia, "Mock Object," Sep. 23, 2008, printed May 31, 2009, http://en.wikipedia.org/wiki/Mock_object, pp. 1-5.

LISA, 2.0 User's Guide, Interactive TKO, Feb. 27, 2003, pp. 1-130.

LISA, 2.0 Developer's Guide, Interactive TKO, Mar. 13, 2003, pp. 1-23.

Chapter 5—Service Discovery, Bluetooth Application Developer's Guide, 2002 (pp. 167-209).

Chatterjee, S., "Messaging Patterns in Service-Oriented Architecture, Part 1," msdn.microsoft.com/en-us/library/aa480027.aspx, Apr. 2004, (pp. 1-21).

Time to live—Wikipedia, the free encyclopedia; 2015; pp. 1-3. http://en.wikipedia.org/wikiiTime_to_live>, examiner annotated document.

U.S. Appl. No. 14/621,248, filed Feb. 12, 2015 entitled Pre-Distribution of Artifacts in Software Deployments, inventor(s) Yaron Avisror.

Web Discussion: "Is TCP protocol stateless or not?" available online at "http://stackoverflow.com/questions/19899236/is-tcp-protocol-stateless or-not" pp. 1-3 (2013).

* cited by examiner

TEMPLATE CATEGORIES > GLOBAL
GLOBAL ⊙
APPLICATION: ROBOTS STORE

DEPLOYMENT TEMPLATES  ⊙ NEW

SCRATCH DEPLOYMENT
USE THIS TEMPLATE > FOR
FULL DEPLOYMENT TYPES

CREATE DEPLOYMENT PLAN >

| INITIALIZATION STEPS | DEPLOYMENT STEPS | POST DEPLOYMENT |

DEPLOYMENT STEPS ⊕

| # | NAME | PROCESS | DEPENDENCIES |
|---|---|---|---|
| 1 | REMOVE TEMP CACHE | CLEAR CACHE [V2-FINAL] | |
| 2 | UPDATE JAVA DETAILS | UPDATE JAVA CONFIGURATION [V1] | 1 |
| 3 | UPDATE HTML FILES | DEPLOY FRONTEND DATA [LATEST] | 2 |
| 4 | DEPLOY WAR | DEPLOY WAR [V2-SUPPORT TOMCAT?] | 3 |
| 5 | CLOSE TICKETS | CLOSE TICKET [VD-SUPPORT MULTIPLE TICKETS] | 4 |

~516

▦ STEPS | ⊟ TEMPLATE PRIORITIES

+ ADD STEP

INITIALIZATION STEPS
1. SET RELEASE DATA
PRE-PLAN
SET MANIFEST DATA
*LATEST*

DEPLOYMENT STEPS
DEPENDENCIES EMP FILES
CLEAR CACHE
*LATEST*
2. CLOSE CM TICKET
CLOSE TICKET
*LATEST*
3. CLOSE TICKETS
CLOSE TICKET
*V4-SUPPORT MULTIPLE TICKETS*
4. DEPLOY WAR
DEPLOY WAR
*V-7 SUPPORT TOMCAT 7*
5. REMOVE TEMP FILES
CLEAR CACHE
*V1-FINAL*
6. UPDATE HTML FILES
DEPLOY FRONTEND DATA

| RELEASES | ARTIFACTS | REPORTS | ADMINISTRATION | | SUPERUSER ▾ | HELP |

DEPLOYMENT PLANS BY PROJECTS

APPLICATION [ROBOT'S STORE ▶]

PROJECTS [⦿ NEW]

DEPLOYMENT PLANS
CLICK A PLAN TO REVIEW BY DEPLOYMENT STAGES AND ARTIFACT PACKAGES. YOU SAVE PHYSICALLY THE ARTIFACT PACKAGE AND NETWORK PLANS AND UPDATE A DEPLOYMENT      [+ NEW DEPLOYMENT PLAN 🔍]

SPRINT 1

| NAME | BUILD | PACKAGE NAME | CREATION TIME | TEMPLATE |
|---|---|---|---|---|
| TEST 030084 9:40 | 21 | BUILD 21 CONTENT | JAN 5, 2014 9:41:02 AM | GLOBAL ▢ ⦿ |
| TEST 0304241 | 20 | BUILD 21 CONTENT | | GLOBAL |
| TEST 2603 | 20 | BUILD 18 CONTENT | | GLOBAL |
| TEST 2603 855 | 20 | BUILD 20 CONTENT | | GLOBAL |
| DP 2303 1753 | 22 | BUILD 22 CONTENT | | GLOBAL |
| TEST 230314 1626 | 22 | BUILD 22 CONTENT | | GLOBAL |
| TEST 230314 12 | 22 | BUILD 22 CONTENT | | GLOBAL |
| TEST 20-03 14 | 12 | BUILD 21 CONTENT | | GLOBAL |
| DEPLOYMENT PLAN FOR B21-TEST | 21 | BUILD 21 CONTENT | | GLOBAL |
| TEST ME 0002 | 12 | BUILD 18 CONTENT | | GLOBAL |
| TEST ME 05001032 | 18 | BUILD 19 CONTENT | | GLOBAL |
| FIXER012211 | 14 | BUILD 16 CONTENT | | GLOBAL |
| BUILD FOR CASE 32451 | 11 | BUILD 11 CONTENT | | GLOBAL |
| TEST NEW TOMCAT DEPLOYMENT | 12 | BUILD 12 CONTENT | | GLOBAL |

SPRINT 2

| RELEASES | ARTIFACTS | REPORTS | ADMINISTRATION | | | SUPERUSER ▼ | HELP |

DEPLOYMENTS > DEMO 09042014

DEMO 09042014 (PENDING ARTIFACTS DISTRIBUTION) EDIT      EXPORT TO PDF [DUPLICATE] [SAVE AS XML]

DESCRIPTION:
PROJECT: SPRINT 1 (21)
APPLICATION: ROBOTS STORE
ENVIRONMENT: QA
TYPE: MINOR
TEMPLATE: GLOBAL/SCRATCH DEPLOYMENT
DEPLOYMENT PLAN: TEST 050614 9:40
SCHEDULE: DEFINE SCHEDULE

DEPLOYMENT PROPERTIES
  APPROVER (1)
▶ MORE (1)  ← 538

DEPLOYMENT PROGRESS
  ✓ VALIDATION (DONE)
  ⊙ DIST. ARTIFACTS TO EXECUTION SERVERS (PENDING)  ⊙ RUN
    DIST. ARTIFACTS TO AGENTS (PENDING)
    DEPLOYMENT (PENDING)
    POST DEPLOYMENT (PENDING)
       ← 536

← 534

| ARTIFACT PACKAGE | ⛁ DEPLOYMENT | ⛁ POST DEPLOYMENT | ⊙ ROLLBACK |

ARTIFACT PACKAGE: BUILD 21 CONTENT

CHOOSE ARTIFACT DISTRIBUTION METHOD [DISTRIBUTE TO AGENTS] OR ONLY EXECUTION SERVERS
  1. DISTRIBUTE TO EXECUTION SERVERS
  2. DISTRIBUTE TO AGENTS
    ← 541

← 540

ARTIFACTS:
HTML > INDEX.HTML > 1.0
WAR > BLOGIC > 6.0
WAR > COMMON > 6.0
WAR > REPORTS > 6.0
WAR > SITE > 5.0

AUTOMATED SOFTWARE DEPLOYMENT

BACKGROUND

The present disclosure relates in general to the field of computer development, and more specifically, to software deployment in computing systems.

Modern software systems often include multiple programs or applications working together to accomplish a task or deliver a result. An enterprise can maintain several such systems. Further, development times for new software releases are shrinking allowing releases to be deployed to update or supplement a system on an ever-increasing basis. Some enterprises release, patch, or otherwise modify their software code dozens of times per week. Further, enterprises can maintain multiple servers to host their software applications, such as multiple web servers deployed to host a particular web application. As updates to software and new software are released, deployment of the software can involve coordinating the deployment across multiple machines in potentially multiple geographical locations.

BRIEF SUMMARY

According to one aspect of the present disclosure, particular deployment logic can be selected that describes a plurality of steps in a type of software deployment. Release data can be identified that defines a selection of a set of software artifacts to be deployed in a particular deployment. Further, environmental data can be selected that describes configuration of a target system for the particular deployment. First associations can be determined, using data processing apparatus, between steps in the plurality of steps and software artifacts in the set of software artifacts. Second associations can be determined between steps in the plurality of steps and configuration information of the target system used in the respective steps. The artifacts can be automatically deployed on the target system, using one or more data processing apparatus, based on the first and second associations.

BRIEF DESCRIPTION OF THE DRAWINGS

FIGS. 5A-5L are screenshots of a graphical user interface for use in connection with an automated software deployment in accordance with at least some embodiments;

Like reference numbers and designations in the various drawings indicate like elements.

DETAILED DESCRIPTION

Figure 1:
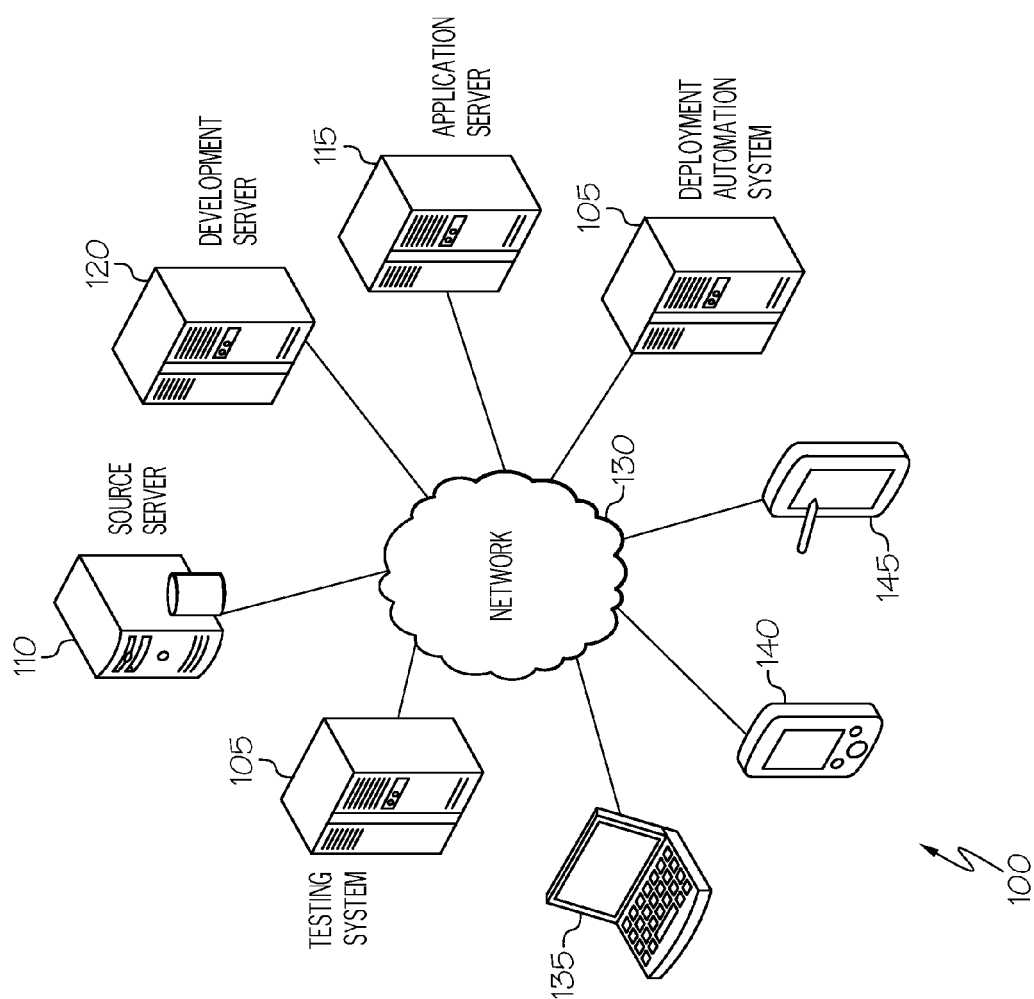
FIG. 1 is a simplified schematic diagram of an example computing system including an example deployment automation system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including a deployment automation system 105, one or more release data source servers (e.g., 110), one or more application server systems (e.g., 115), including web servers, application servers, database systems, mainframe systems and other examples. One or more development servers (e.g., 120), among other example pre- or post-production systems, can also be provided that can have software artifacts deployed thereto. Deployment automation system 105 can make use of data modules that describe the features of a deployment of a given piece of software, embodied by one or more software artifacts, from the artifacts' source(s) onto one or more particular target systems (e.g., 115, 120). The modules can be provided by a variety of sources and can include information defined by users and/or computing systems. The modules can be processed by the deployment automation server 105 to generate a deployment plan that can then be read by the deployment automation server 105 to perform the deployment of the artifacts onto the target system(s) without the further intervention of a user.

In some implementations, following deployment of a new software release or update to previously deployed software, a system 100 can further include an automated testing system 125 which can be invoked by a user or the deployment automation system 105 upon completion of the deployment to ensure that the deployment was successful and the deployed software is operating as intended. Testing software 125 can include automated testing to simulate inputs of one or more users or client systems to the deployed software and observation of the responses to the deployed software. In some cases, the deployed software can respond to the inputs by generating additional requests or calls to other systems. Interactions with these other systems can be provided, through the testing system 125, by generating a virtualization of the other systems with which the deployed system is designed to interact. A virtualized service or system can be provided, for instance, according to one or more features or principles as described in U.S. Pat. No. 8,112,262 entitled "Service Modeling and Virtualization," which is incorporated by reference herein. Other testing features can be provided in connection with the automated testing system 125 allowing a user to schedule or trigger, without further input, both the deployment and post-deployment validation of the deployed software.

Deployment of release data artifacts can involve the distribution of the artifacts from remote sources (e.g., 110) to their intended destinations (e.g., 115, 120) over one or more networks 130, including private and/or public networks. In some instances, the size of the files embodied in the artifacts can be quite significant in size and impose high demands on network (e.g., 130) and processing resources. In some implementations, artifacts can be strategically pre-distributed to ease the deployment process. For instance, pre-distribution can be accomplished according to one or more of the principles and features described in U.S. patent application Ser. No. 14/621,248, filed on Feb. 12, 2015 and entitled "Pre-distribution of Artifacts in Software Deployments," incorporated by reference herein. Other data can be communicated over one or more networks 130 interconnecting devices in system 100. For instance, data modules utilized by the deployment automation system 105 can be accessed by or communicated to the deployment automation system 105 from remote sources over a network. A target system with a recently deployed software release can communicate with testing system 125 in connection with a post-deployment test of the software release, among other examples.

Computing environment 100 can further include one or more user computing devices (e.g., 135, 140, 145) that can be used to allow users to interface with resources of deployment automation system 105, target servers 115, 120, testing system 125, etc. For instance, users can utilize computing devices 135, 140, 145 to build deployment modules for use by the deployment automation system 105 in automated software deployments, and can schedule or launch an automated deployment through an interface provided in connection with the deployment automation system, among other examples.

In general, "servers," "clients," "computing devices," "network elements," "database systems," "user devices," and "systems," etc. (e.g., 105, 110, 115, 120, 125, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a deployment automation system 105, source server 110, testing system 125, application server 115, development server 120, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Software releases continue to occur with increasing regularity as these software associated with these releases evolve in complexity and technology. Such releases include both releases of new software systems as well as updates or patches to existing software systems. Valuable information technology (IT) personnel and resources are dedicated within some enterprises to developing and carrying-out these deployments. Traditionally, human users are employed throughout the process of the deployment. Further, human IT resources are not only expensive, but error prone, resulting in some deployments which are incorrect and may need to be re-deployed, further consuming time and personnel resources. Additionally, some systems may be sensitive to down periods that may be required in order to allow deployment of new software releases on the system. The time, processing, and network capacity needed to perform the deployment may result in the designation of defined deployment windows. IT personnel in charge of the deployment may be directed to ensure that the deployment is completed within this window. Longer deployment windows can thus be costly, not only due to the cost in human and computing resources involved in performing the deployment, but also the costs of allowing the target system or portions therefor to remain down during the deployment window. Further, human error can add complication and expense, for instance, from accidentally omitting machines from deployment, environment misconfiguration, inconsistency when deploying the same content across different environments, among other examples.

Figure 2:
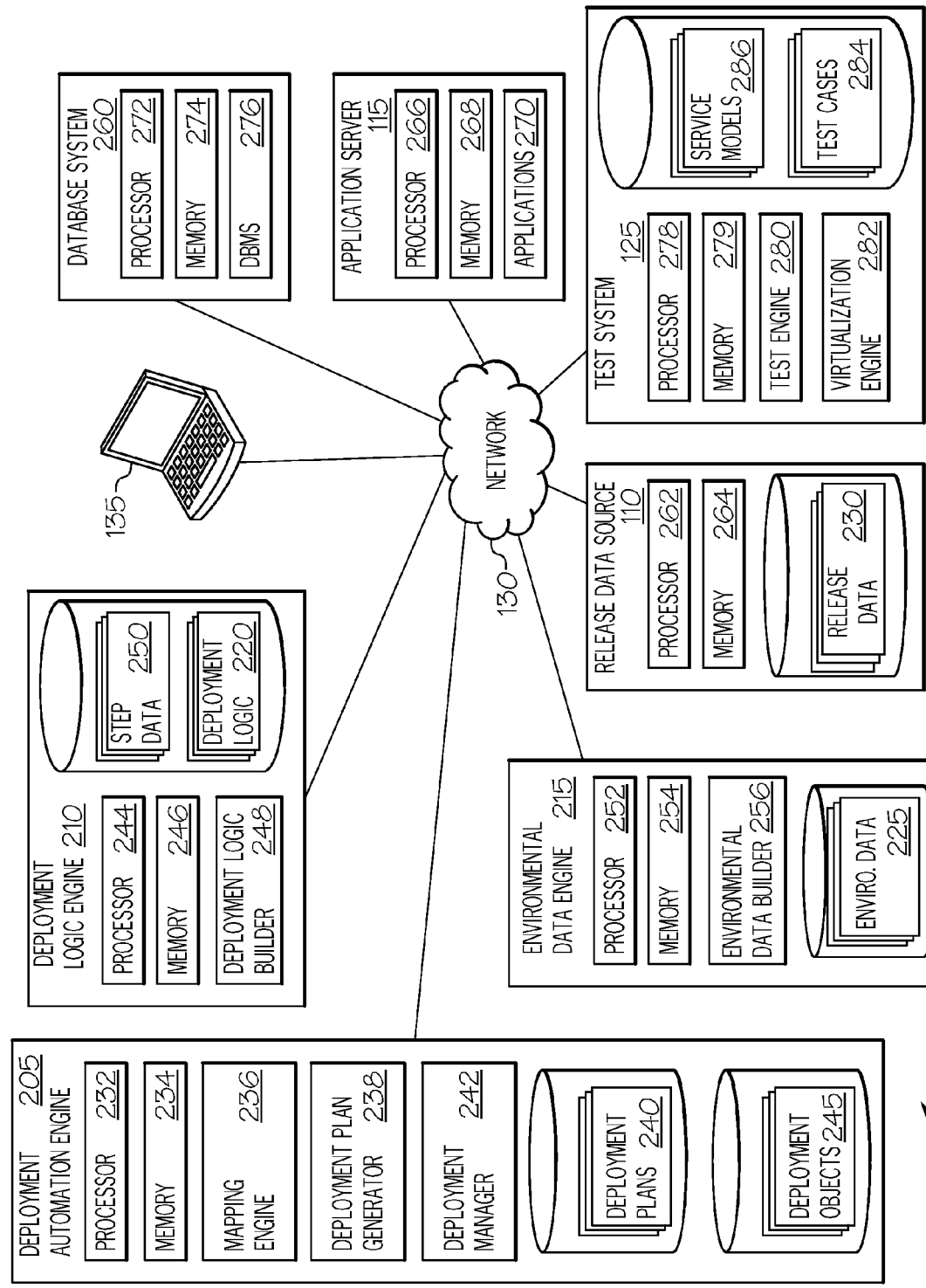
FIG. 2 is a simplified block diagram of an example computing system including an example deployment automation engine in accordance with at least one embodiment.

At least some of the systems described in the present disclosure, such as the systems of FIGS. 1 and 2, can include functionality providing at least some of the above-described features that, in some cases, at least partially address at least some of the above-discussed issues, as well as others not explicitly described. For instance, in the example of FIG. 2, a simplified block diagram 200 is shown illustrating an example environment including an example implementation of a deployment automation engine 205 (e.g., included in a deployment automation system 105) to perform an automated deployment of a software release. In one implementation, the deployment automation engine 205 can include at least one data processor 232, one or more memory elements 234, and functionality embodied in one or more components embodied in hardware- and/or software-based logic. For instance, a deployment automation engine 205 can include a mapping engine 236, deployment plan generator 238, and deployment manager 242, among potentially other components. Deployment plan data 240 can be generated using the deployment automation engine (e.g., using deployment plan generator 238 and mapping engine 236). Deployment plans 240 can be generated to represent the generic deployment of a particular software package (e.g., upon potentially any target system) that includes a set of artifacts. Deployment plans 240 can be generated from a combination of an instance of deployment logic 220 and an instance of release data 230. The release data 230 paired with the corresponding deployment logic 220 can include the artifacts that are to be deployed using the deployment steps defined by the deployment logic instance. A deployment plan can be one of a library of deployment plans. Each deployment plan can be reusable in that it can be used to deploy the corresponding release on multiple different environments. Accordingly, deployment objects 245 can be generated (e.g., using deployment manager 242) for use in guiding automated deployment, performed by the deployment automation engine 205, on a particular environment. A deployment object 245 can be generated, in one example implementation, from a combination of an instance of a deployment plan (e.g., 240) and environment data (e.g., 225) corresponding to the environment where on the release is to be deployed (as defined in the deployment plan). In other instances, deployment objects can be generated directly from a combination of deployment logic 220, environment data 225, and release data 230 corresponding to the particular deployment (e.g., rather than through a combination of a deployment plan and an instance of environment data), among other potential implementations.

Figure 3:
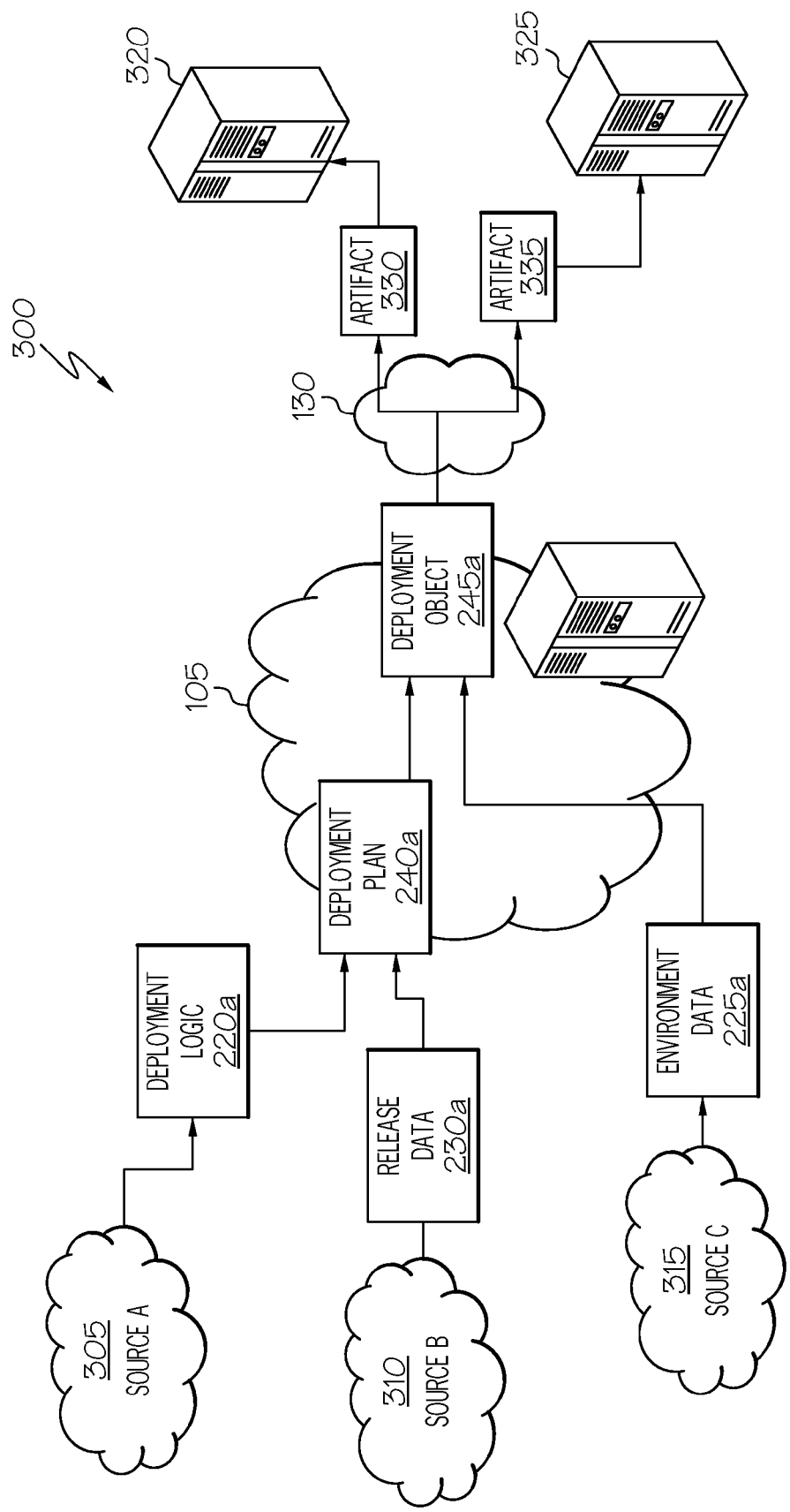
FIG. 3 is a simplified block diagram illustrating an example automated deployment in accordance with at least one embodiment.

As shown in the simplified block diagram 300 of FIG. 3, three data module types can be defined: 1) deployment logic (e.g., 220a); 2) release data (e.g., 230a) (including artifacts to be deployed); and 3) environment data (e.g., 225a). In this example, an instance of a deployment plan data module (e.g., 240a) can be generated from a set comprising one module from each of the deployment logic and release data types. The deployment plan 240a can define a mapping of deployment logic to release data to define which deployment logic steps are performed using which artifacts defined in the release data. A specific deployment instance, or object, 245a can be generated from a combination of a deployment plan 240a and an environment data module 225a corresponding to the target of the particular deployment. The deployment object 245a can be generated by mapping deployment logic to target sub-systems and components of the environment defined in the environment data module. The deployment object 245*a* can include machine readable data that can be accessed and read by a deployment automation system 105 to perform all of the steps to automate the deployment of the artifacts on the target environment.

In some cases, a single source can provide each of the three modules (e.g., 220*a*, 225*a*, 230*a*) for use in generating a deployment plan (e.g., 240*a*) and deployment object (e.g., 245*a*). In other cases, modules in the respective set can be received from potentially multiple different sources (e.g., 305, 310, 315). Indeed, multiple different parties can be involved in activities related to each of the three module types and can be responsible for generating each module. For instance, three different persons may be involved, in a given deployment, to define the deployment logic, provide the release data, and define the environment data. These data modules can be defined and provided for use in deployments. Indeed, the data modules (e.g., 220*a*, 225*a*, 230*a*) can be re-usable and can be utilized in multiple different deployments. For instance, at least one of the data modules in a set to define a deployment may be a previously generated module defined, for instance, in connection with an earlier (and potentially otherwise unrelated) deployment.

A user can define a deployment by selecting one of each of the deployment logic (e.g., 220*a*), release data (e.g., 230*a*), and environment data (e.g., 225*a*). A deployment automation system can accept these inputs, obtain the respective selected modules, and consolidate these pieces together in a deployment plan (e.g., 240*a*) and a deployment object (e.g., 245*a*). A user can select a deployment plan from a library of generated deployment plans and select a particular environment for the deployment to trigger the generation of a corresponding deployment object (e.g., 245*a*). The deployment automation system (e.g., using a deployment manager 242) can access the selected deployment object and run the deployment automatically and independent of a user from the information included in the deployment object. Deployment can include identifying and accessing one or more target systems (e.g., 320, 325) hosted on one or more computing devices, authenticating to the target systems, and downloading artifacts (e.g., 330, 335) identified in release data 230*a* and hosted on a source (e.g., 110) to the target systems 320, 325 over one or more networks (e.g., 130).

Deployment logic (e.g., 220*a*) can include the workflow, or steps, needed to perform a particular type of deployment and can be based on the type of system targeted by the deployment. The steps can also vary depending upon the type of deployment, such as a full deployment, immediate patch, among other examples. Deployment logic, once defined, can be reused to perform the same type of deployment, using the same defined set of steps, in multiple subsequent deployments, including deployments of various different release artifacts on various different target systems. Further, the deployment logic can be built from pre-defined tasks, or deployment steps, that can be re-usably selected from a library of deployment tasks to build a single deployment logic module for a given type of deployment.

Release data (e.g., 230*a*) includes the artifacts (or files) to be deployed in a specific version or release. Release data can additionally identify the source or host of the artifacts, such that the artifacts can be retrieved by the deployment automation engine for deployment on target systems. Other information can also be included in the release data, such as a deployment manifest, which can include sensitive data corresponding to the release (e.g., content that should be deployed, bugs that are to be addressed by the release, change requests), among other examples. Attaching release data, deployment manifests, and other information to the same genericized deployment logic package can thereby allow re-use of the deployment logic (e.g., without modification).

Environment data (e.g., 225*a*) can define a particular target environment or subsystem within a system. Distinct environment data modules can be defined and maintained for each potential target within the system. Each environment data module can include information such as the target's configuration, passwords, addresses, and machines, as well as dependencies of the target on other machines in the system. The environment data can include any information that might be used to access, authenticate to, and deploy the release data on the corresponding target systems.

When a specific release is planned, a user can define the combination of deployment logic, release data, and environment data to be used. The system, without further intervention by the user, can then collect the selected modules, and automatically identify, for each step of the deployment logic, what release data is to be applied and how the step is to be executed at the target. The deployment logic can also define the order in which the steps are performed together with the dependencies of the steps on other steps. With these associations made, the system can define a deployment plan and proceed with the deployment steps as defined by the deployment logic. The deployment plan data (e.g., 240*a*) can also be saved and reused, for instance, as a template for another, similar deployment.

Returning to FIG. 2, a mapping engine 236 can be provided to identify how to map various steps in a particular deployment logic module (e.g., 240) with target system attributes (e.g., target address, authentication information) defined in a selected environmental data module (e.g., 225) as well as the artifact(s) to be used within that particular step (as defined in release data 230). Deployment automation engine 205 can generate sets of deployment plan data 240, any one of which can be selected, paired with environment data 225, and used (e.g., by deployment manager 242) to perform the steps to complete a corresponding software deployment on a corresponding target.

A deployment logic engine 210 can be provided that includes at least one data processor 244, one or more memory elements 246, and functionality embodied in one or more components embodied in hardware- and/or software-based logic. For instance, a deployment logic engine 210 can include a deployment logic builder 248 that can be used to define and generate deployment logic modules 220. Each deployment logic module can define a set of generic steps to be performed in a deployment and can further defined dependencies and ordering of the steps. Step data 250 can be associated with each step. Indeed, a library of step data 250 can be provided, at least some of which are pre-defined. The steps defined in the library of step data 250 can be reused across potentially multiple deployment logic modules 220. A use can define new or modify existing deployment logic modules by selecting steps from the library of steps to include in a deployment type corresponding to the deployment logic module. The ordering and dependencies of the selected steps can also be defined and described in a resulting deployment logic module generated based on the user inputs. Each deployment logic module 220, once defined and generated, can be made available for use and re-use in potential multiple different deployment plans corresponding to multiple different software deployments.

An environmental data engine 215 can be provided that includes at least one data processor 252, one or more memory elements 254, and functionality embodied in one or more components embodied in hardware- and/or software-based logic. For instance, an environmental data engine 215 can include environmental data builder logic 356 for use in defining and generating environmental data modules 225. A user can potentially interface with the environmental data engine 215 to identify the target and define configuration parameters specific to that target. A single environmental data module can, in some instances, describe all of the machines and configuration information that will be accessed in a given deployment. Accordingly, an environmental data module's target can include multiple machines or sub-systems that will be involved in a single deployment. In some implementations, environmental data builder 225 can include logic for scanning and discovering potential target systems within a system as well as configuration parameters of the target systems. In such implementations, at least some of the environmental data modules can be populated, at least in part, with information collected by a computing system through automated scanning.

One or more release data sources (e.g., 110) can be provided. A release data source can be a server including at least one processor device 262 and one or more memory elements 264 to include logic for receiving, maintaining, and eventually sending various software artifacts in release deployments within the system. In some cases, a single release data source can be maintained as a repository for all releases that are to be performed for a system. In other cases, multiple release data sources can be provided. Copies of developed release artifacts 230 can be deposited in the release data sources (e.g., 110) of a system.

As noted above, environmental data can describe various targets on which artifacts may be deployed. For instance, environmental data may identify and describe configuration parameters of an application server (e.g., 115), database system (e.g., 260), or other system. An application server 115 can include, for instance, one or more processors 266, one or more memory elements 268, and one or more software applications, including applets, plug-ins, operating systems, and other software programs that might be updated, supplemented, or added using an automated deployment. Some software releases can involve updating not only the executable software, but supporting data structures and resources, such as a database. Accordingly, a database system 260 can, in some examples, be targeted together with application server 115 within a deployment, the database system including one or more processors 272, one or more memory elements 268, and a database management system 276 managing one or more databases and their composite tables. Depending on the type of the system targeted in a deployment, the type and content of configuration data (as identified in environmental data modules 225) may vary substantially in accordance with the nature of and mechanisms for accessing the respective system.

After a deployment is completed and the desired artifacts loaded onto a target system, it may be desirable to validate the deployment, test its functionality, or perform other post-deployment activities. Tools can be provided in a system to perform such activities, including tools which can automate testing. For instance, a test system 125 can be provided that includes one or more processors 278, one or more memory elements 279, and one or more components implemented in hardware and/or software to perform or support tests of a deployed software package. For instance, a test system 125 can include a test engine 280 that can initiate sample transactions with the deployed software to test how the deployed software responds to the inputs. The inputs can be expected to result in particular outputs if the software is deployed correctly. The test engine 280 can test the deployed software according to test cases 284 that define how a test engine 280 is to simulate the inputs of a user or client system to the deployed software and observe and validate responses of the deployed software to these inputs.

Deployed software may consume resources of and be dependent other backend systems, including services and third-party systems. Rather than testing compatibility of deployed systems with the live versions of these backend systems, virtualized versions of the backend systems can be generated based on service models 286. Service models and virtualized services can be implemented in accordance with one or more principles described in U.S. Pat. No. 8,112,262, among other examples. In some cases, service virtualization can be instantiated in connection with tests of deployed software as orchestrated by the test engine 280. Further, the test cases and service models to be employed in post-deployment assessment of a release can be pre-designated such that post-deployment testing can proceed automatically and/or immediately following the automated deployment of the release, among other examples.

It should be appreciated that the architecture and implementation shown and described in connection with the example of FIG. 2 is provided for illustrative purposes only. Indeed, alternative implementations of an automated deployment system can be provided that do not depart from the scope of this Specification. For instance, one or more of the deployment logic engine 210, environmental data engine 215, and release data source 110, can be integrated with, included in, or hosted on one or more of the same devices as the deployment automation engine. Additionally, a central deployment automation system can be provided, in some implementations, as a service capable of providing automated deployments to a variety of different systems owned by multiple different entities and/or deploying release artifacts developed by a variety of different vendors and sources. A centralized system can leverage deployment logic modules generated in other deployments for or on behalf of multiple different entities, among other potential advantages. In other instances, a deployment automation system can be a private or enterprise-specific implementation handling deployments of software developed by and/or targeting systems of a single entity, among other examples.

Figure 4:
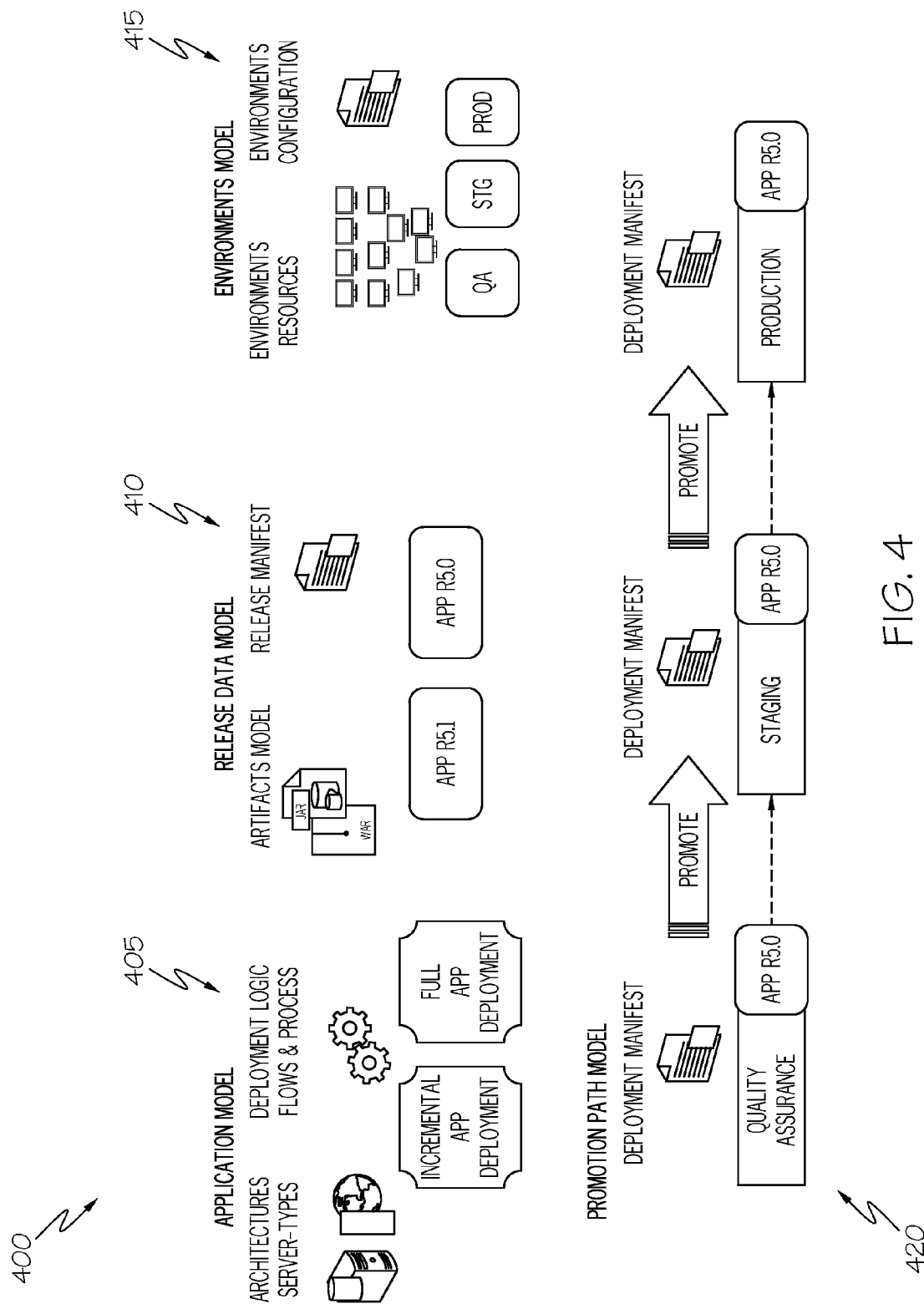
FIG. 4 is a simplified block diagram illustrating aspects of an example deployment cycle in accordance with at least one embodiment.

Turning to FIG. 4, a simplified block diagram 400 is shown illustrating additional details of a lifecycle of automated deployments. As noted herein, data modules utilized by a deployment automation system can be reusable. Deployment plans can also be re-used as developed from a particular deployment logic module and a resource data module (including the artifacts to be deployed). For instance, as the lifecycle of a software system evolves, multiple deployments may take place, for instance, as the software system migrates from a development stage, to a quality assurance stage, to a staging stage, and production stage (e.g., in accordance with Promotion Path Model 420. Indeed, as the software system evolves, new artifacts may be developed and the software system can be deployed on multiple different target machines allocated for each stage, among other examples. The deployment, in one example, can be logically organized into an Application Model 405 (including reusable deployment logic and information describing topology of the application), Release Data Model 410 (including artifacts, manifests, and other deployment specific information), and Environments Model 415 (including environment data describing environment resources, configuration information, etc.). The Promotion Path Model, in this example illustration, can describe the sequence and order of environments in which the content is to be deployed (e.g., in accordance with a production plan).

Figure 5A:
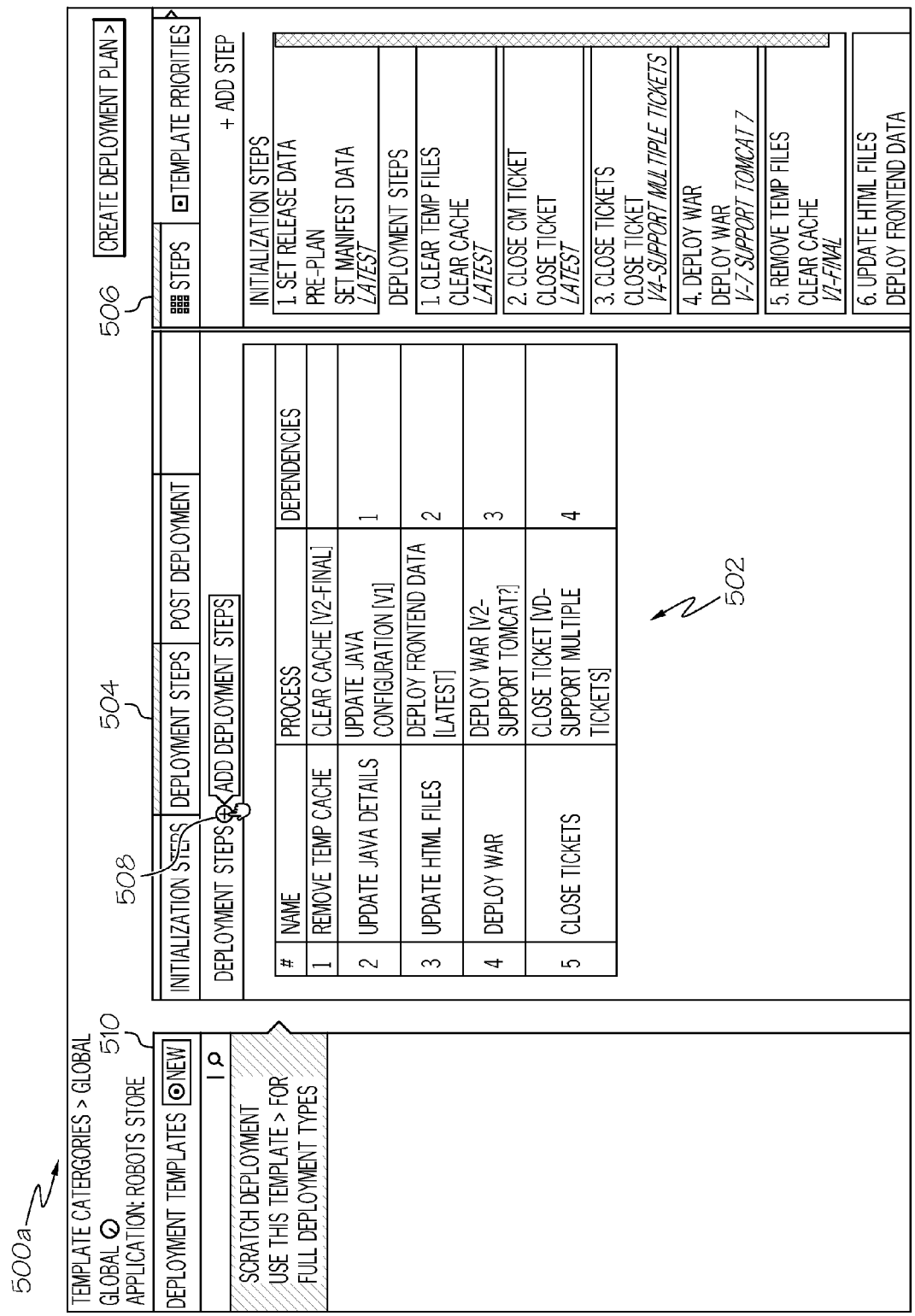

FIGS. 5A-5L are screenshots 500a-l illustrating example user interfaces for building deployment logic, generating a deployment plan file from the selected deployment logic and release data, and selecting environment data corresponding to a target on which to launch the deployment. For instance, the screenshot 500a of FIG. 5A shows an example user interface for viewing details of, editing, and building deployment logic (or "template"). A pane 502 can include a listing of the steps that have been selected for inclusion in the defined flow of the deployment logic. A menu bar 504 can be provided to toggle between views of deployment phases defined in the deployment logic template. For instance, one or more steps can be associated with initialization, one or more additional steps associated with deployment, and one or more steps associated with post-deployment. Initialization steps can include, for instance, parsing the content (e.g., files) of a release and deciding which logic to use in the deployment, provisioning machines for use in performing the deployments, obtaining configuration data from external resources, and securing approval for the deployment. Post deployment steps can include steps to invoke and use a testing system to run one or more test cases and/or use one or more virtual services to test the deployed software upon completion of the deployment steps, among other examples. An additional view 506 can show listings of steps included within each of the phases.

Continuing with the example of FIG. 5A, the pane 502 can include a listing of the steps defined for the particular deployment as well as dependencies defined for each step. For instance, Step 2 can be defined to be dependent on Step 1, such that Step 2 is to begin following completion of Step 1, among other examples. Indeed, in some cases, a step may not be dependent on any other step in the deployment logic template. Alternatively, in other cases, a step can dependent on the completion of multiple steps or multiple steps can be dependent upon the same particular step, and so on.

Figure 5B:
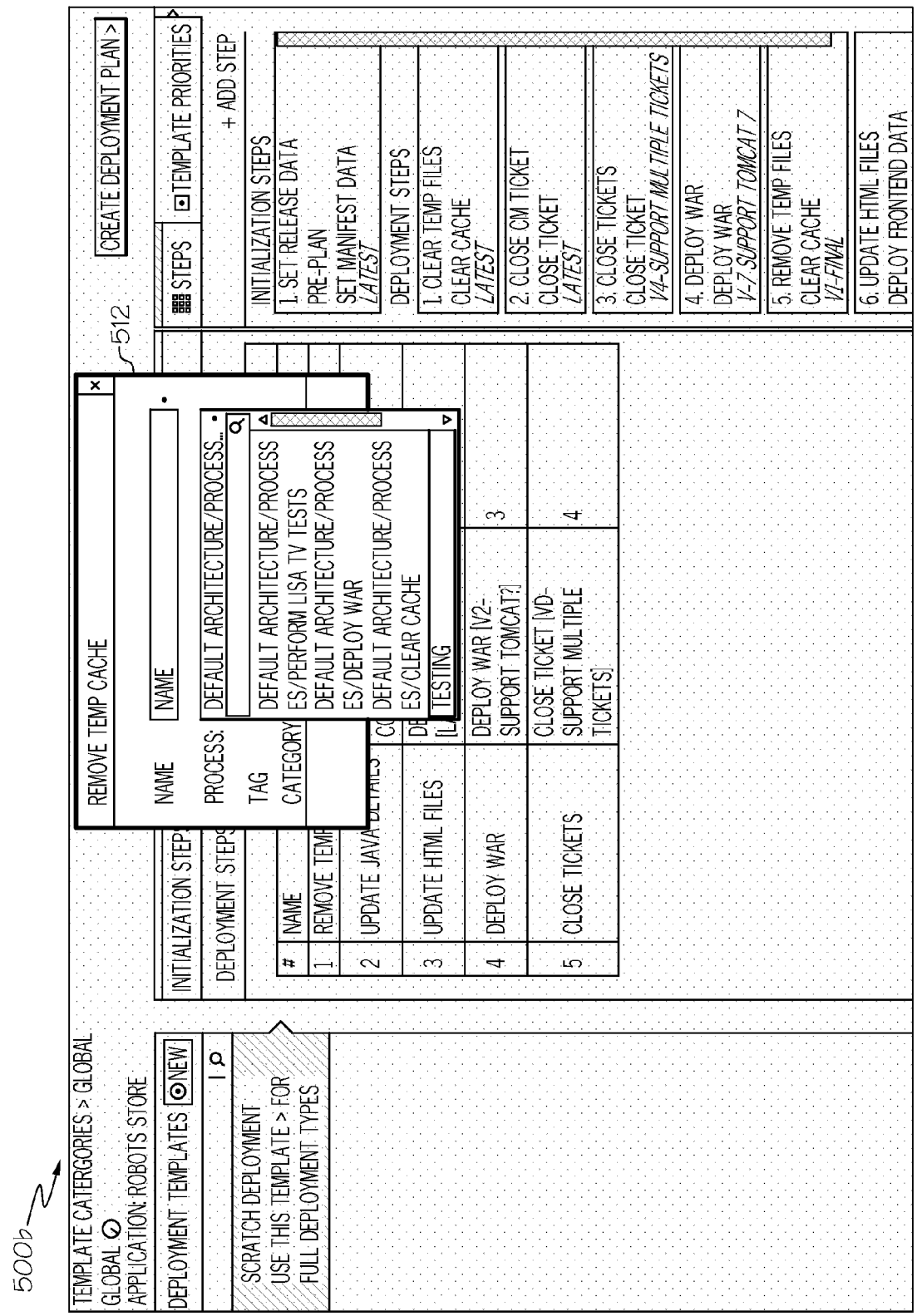

In the example of FIG. 5A, a template can be selected for editing within pane 510. New deployment logic templates can be created as well, for instance, through the selection of the "New" button in pane 510. Deployment steps can be added or removed to a new or existing deployment logic template. For instance, selecting button 508 can allow a user to define an additional step to add to a deployment logic template. FIG. 5B shows a window 512 that can be presented allowing a user to search a library of pre-defined steps that might be re-usably selected and added to the deployment logic template. Controls can also be provided to allow a user to launch a step definition user interface allowing the user to define or provide an XML file or other data embodying the step logic. The user can select a pre-existing or newly created step for use within the deployment logic template being modified.

A user can also define deployment logic by deleting (or replacing) steps and defining ordering of the steps by editing step dependencies, among other features. For instance, as shown in the example of FIG. 5C, by hovering over a particular one of the selected steps controls (e.g., 518) can be presented that, when selected, allow the user to perform actions on the selected step, such as to delete the step or edit dependencies of the step (e.g., using control 518), among other examples. When the user is satisfied with the deployment logic template steps and flow, such that the flow describes the actions involved in performing a given deployment, the user can save the deployment logic template. In this example, the deployment logic can describe the flow for performing a scratch, or full, deployment of new software on a system. For instance, the steps can include removing temporary files by clearing a cache, updating Java configuration, creating directories, copying files, modifying files, restarting machines (e.g., after deployment), among other examples. For other types of deployments, other steps and flows can be defined within a corresponding deployment logic template.

Figure 5D:
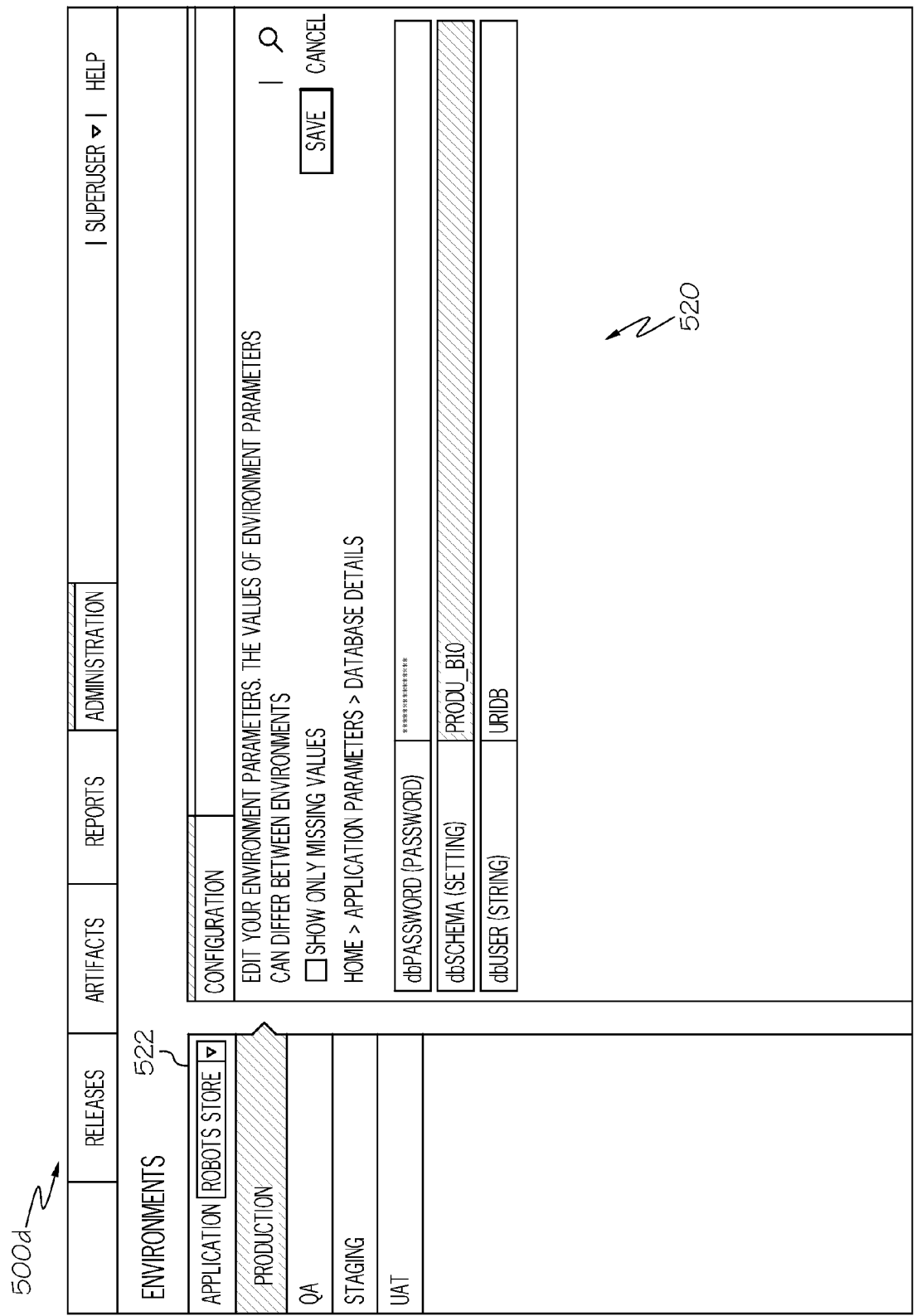

Turning to the screenshot 500d of FIG. 5D, an example user interface 520 is shown to generate environmental data modules for a variety of different environments. For instance, a user can select a particular environment or target from a menu provided in pane 522. In this example, targets can be grouped by a function, application, or other common characteristic, such as geography, machine type, etc. Names of the targets can be presented. In this example, targets can be grouped by project, or application, and the targets can correspond to targets in each of a variety of stages within that project. For instance, a Production target, Quality Assurance (QA) target, Staging target, and User Acceptance Testing (UAT) target environments can be presented. Selection of one of the targets in pane 522, can cause a configuration view to be presented in pane 522. Within this pane 522, a user can define configuration information for the target, including application parameters and (as shown in FIG. 5D) database details of the target. Depending upon the target, differing parameters may be defined, to say nothing of unique parameter values. For instance, as shown in the example of FIG. 5D, a Production target can include a database and database parameters can be defined as configuration information for the Production target, including database password, database schema, database user ID, and so on. Upon selecting and specifying values for each of the parameters to be included in the Production target's parameters, the changes can be saved to define a new or update an existing environmental data module.

In FIG. 5E, a user interface is shown presenting a view 524 of a portion of a library of defined deployment plans. Additional windows (e.g., 526) can be provided to assist a user in filtering, viewing, and selecting a given deployment plan. Each deployment plan can be constructed from a pairing of a deployment logic template with a set of artifacts (e.g., a release data module) and can be specific to that pairing. Each deployment plan can be potentially reused to deploy the same set of artifacts on multiple different targets in multiple different deployments. Selection of any one of the presented deployment plans (e.g., in the listing of view 524) can cause additional user interface views and tools to be presented allowing a user to assess and potentially modify the deployment plan.

Figure 5F:
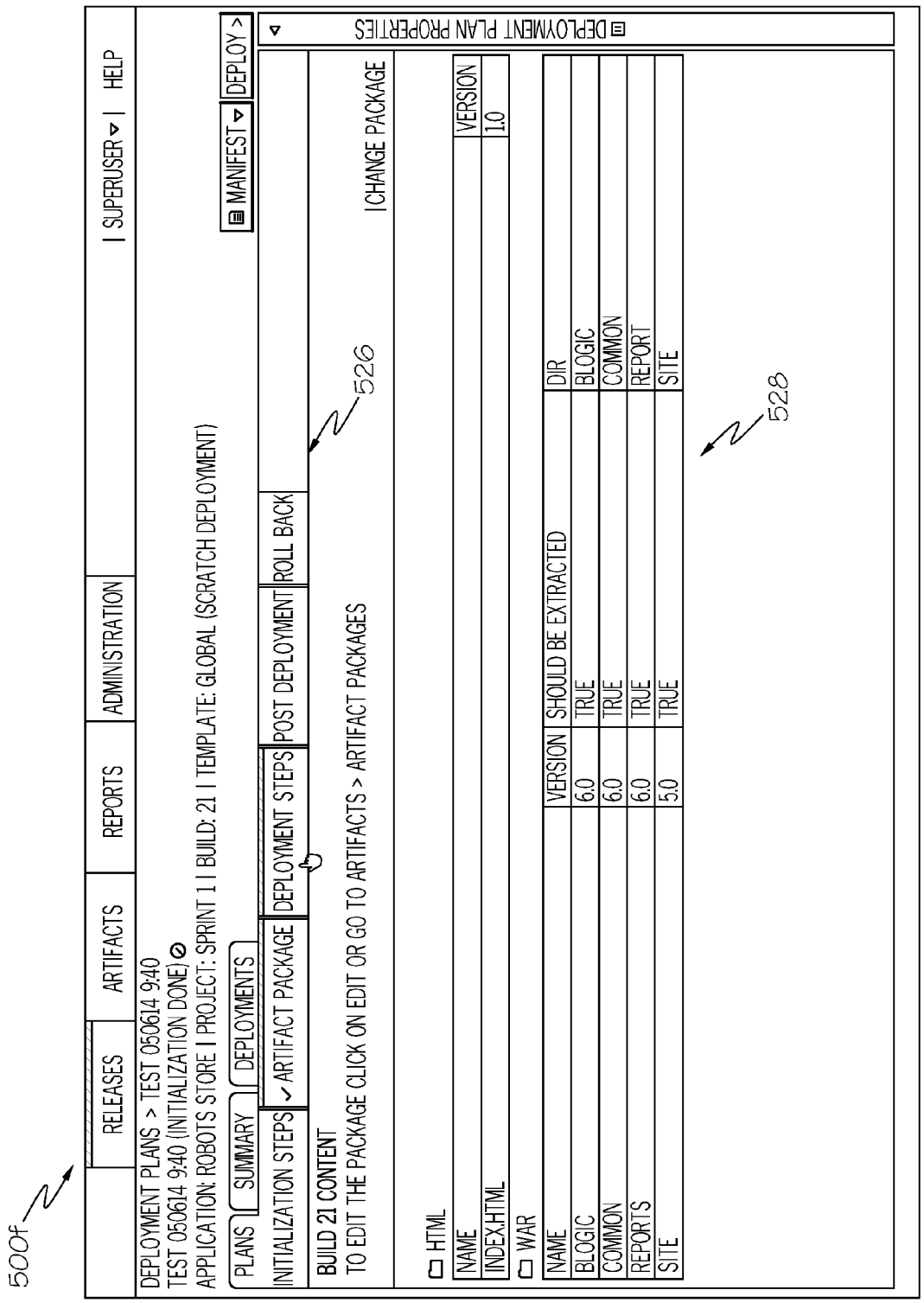

Turning to the example of FIG. 5F, a screenshot 500f is shown of a view of a selected deployment plan (e.g., selected from the listing of view 524 in FIG. 5E). For instance, a user can view various aspects of the deployment plan by navigating through menu 526. In the example of FIG. 5F, a view of the Artifact Package of the deployment plan can be viewed. The artifact package can list all of the artifacts to be deployed in the deployment, as provided and defined in a release data module. For instance, in this example, a release entitled "build 21" can include deployment of an HTML artifact named index.html and multiple Web application Archive (WAR) artifacts (e.g., "blogic," "common", "reports," and "site") can be provided for deployment. Additional information can be provided for the various artifacts, such as their versions, information concerning their source and extraction, etc. Release data modules can also be defined by users. In some cases, release data can be provided as an XML file that can be parsed to identify the artifacts to be deployed together with any artifact-specific attributes and other relevant information.

Figure 5G:
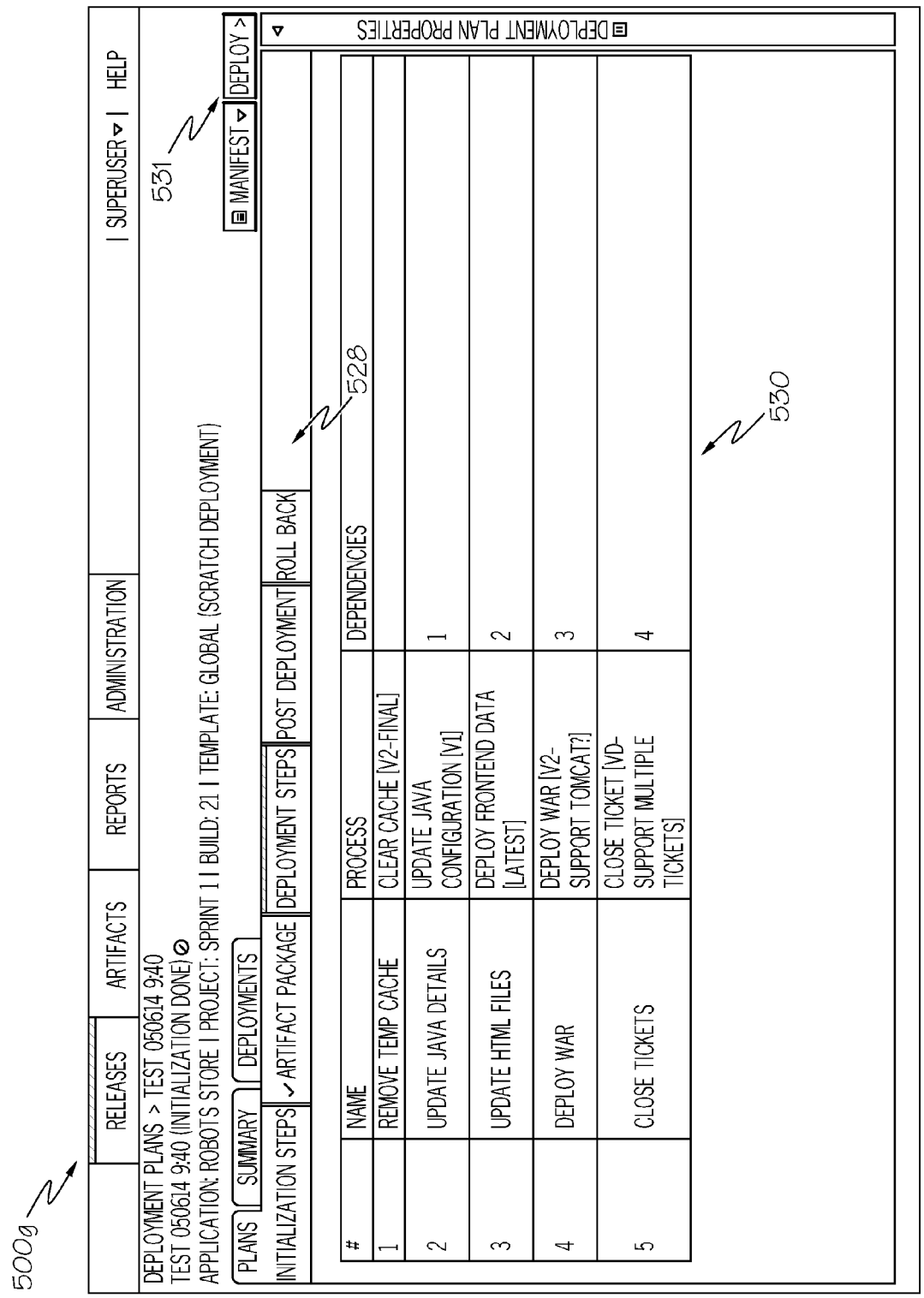
Figure 5H:
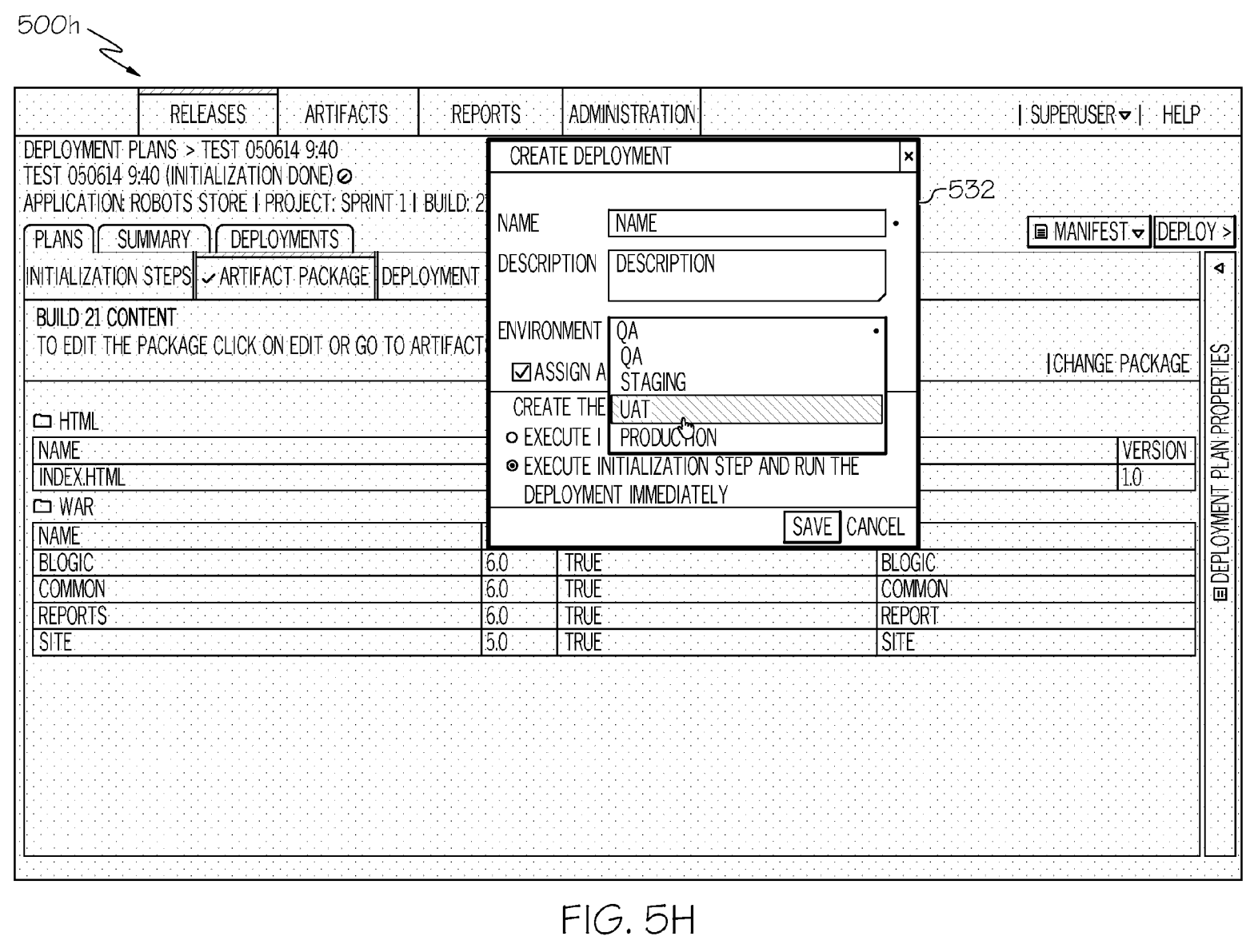

Continuing with the previous example, the artifacts shown in view 528 can correspond to release data that has been paired with a deployment logic template to form the corresponding deployment plan. Turning to FIG. 5G, a user can select to view the deployment steps as provided by the deployment logic template (e.g., as presented in view 530). Through the views provided in the examples of FIGS. 5F and 5G, a user can confirm that the deployment plan is correct and even make last minute changes to either the deployment logic or artifact sets.

Upon confirming that the deployment plan has been accurately generated, the user can select a Deploy button 531 to cause the deployment plan to be scheduled for use in a deployment. In this example, selection of Deploy 531 can cause a window 532 to presented, as show in FIG. 5H, allowing the user to select the target environment on which the deployment plan is to be executed (i.e., to automatically deploy the artifacts on the target environment). Selection of one of the available targets in window 532 can cause the deployment plan to be associated with an environmental data module corresponding to the selected target. The association of a deployment plan with a selected target can define a "Deployment" object. The deployment object can be saved and held until the deployment is scheduled or is to be manually launched. For instance, in the example of FIG. 5H, a user can select a particular one of the available environments (e.g., "UAT") to cause the deployment plan (e.g., illustrated in FIGS. 5F-5G) to be paired with the environmental data corresponding to the selected environment.

As discussed above, a deployment plan can be generated from deployment logic templates and release data to map particular steps to particular artifacts' to be accessed and/or deployed in the step. Further, pairing the deployment plan to given environmental data can cause a deployment automation system to map further steps (as well as artifact deployments) to corresponding machines identified in the environmental data and the machine's respective configuration information. For instance, a deployment step can involve accessing a target's database and inserting data into one or more tables of the database. The deployment object can map, within a deployment object, configuration information identifying an address of the database and the database's access parameters (e.g., password, username, etc.) to the step described in the deployment logic template.

Information included in a deployment object can also be made available for inspection to a user through one or more graphical user interfaces. For instance, as shown in the screenshot 500i of FIG. 5I, views 534, 536, 538, 540 are presented in a graphical user interface summarizing a deployment object created from a pairing of the example deployment plan of FIGS. 5F and 5G with an environmental data module corresponding to a Quality Assurance (QA) environment. View 534 can summarize general characteristics of the deployment, including a project and application addressed by the release, as well as the target system (e.g., "QA"), the deployment logic template employed (e.g., "Global/Scratch Deployment") and the deployment plan object corresponding to the deployment (e.g., "Test 050614 9:40"). Timing of the deployment can also be specified (automatically or by a user), for instance, to schedule the launch of the deployment within a particular deployment window. Window 536 can present a view of the deployment progress. As the stages of the deployment (e.g., validation, artifact distribution to execution servers, distribution of artifacts to deployment agents (or caches), deployment, and post-deployment) progress, GUI elements can be presented to indicate the progress and controls may be presented to allow a user to launch (or pause or cancel) the automated handling of the next stage of the deployment, among other examples. A view 538 can also be provided allowing a user to view additional deployment properties (e.g., included in the metadata of the release). Additionally, a pane 540 can be provided to allow users to view various aspects of the deployment. For instance, as shown in the example of FIG. 5I, a view of the "Artifact Package" is selected in the menu 541 and the listing of the artifacts to be deployed are presented along with selectable deployment options (e.g., the artifact distribution method) that can be applied by the deployment automation engine during the automated deployment.

Figure 5J:
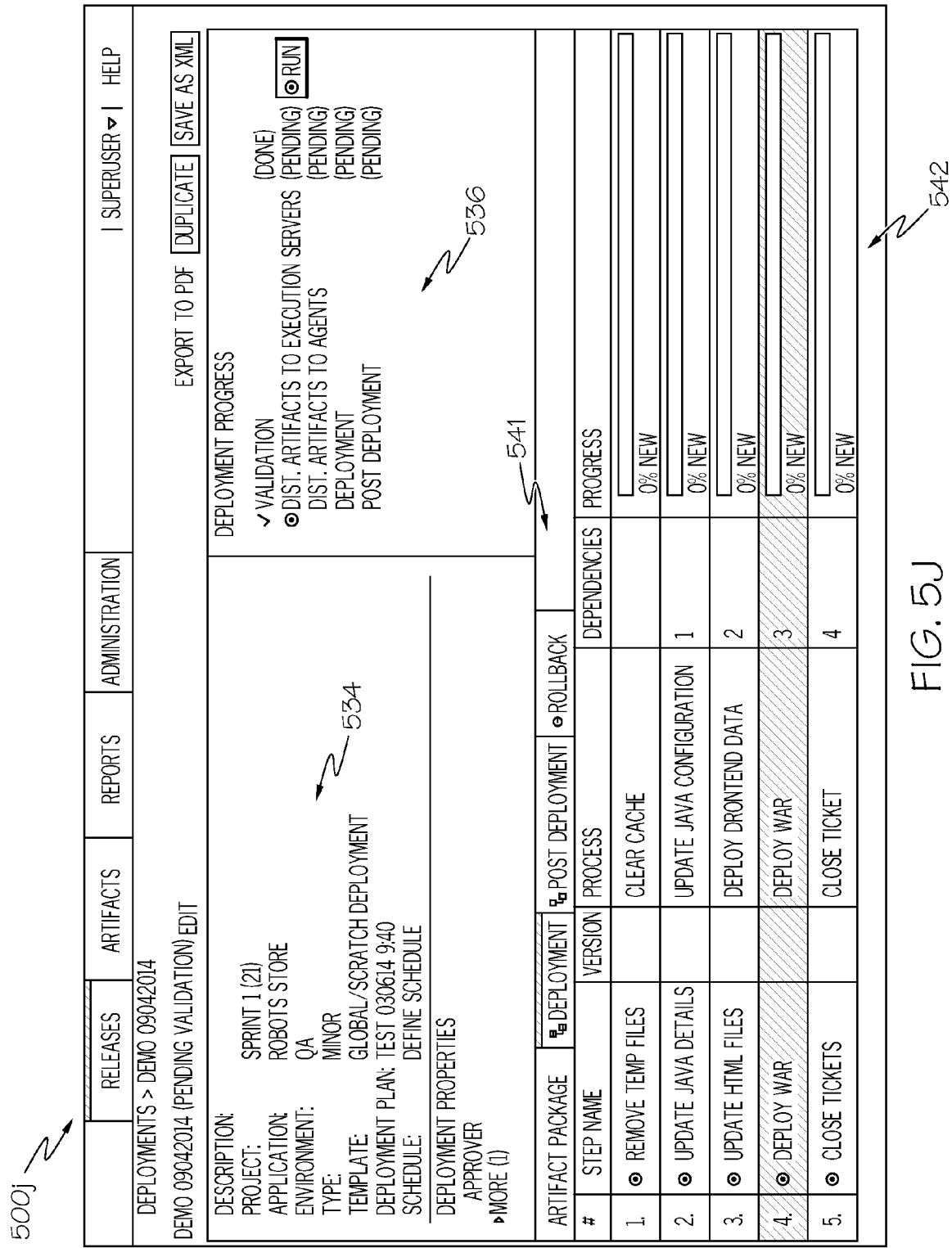
Figure 5K:
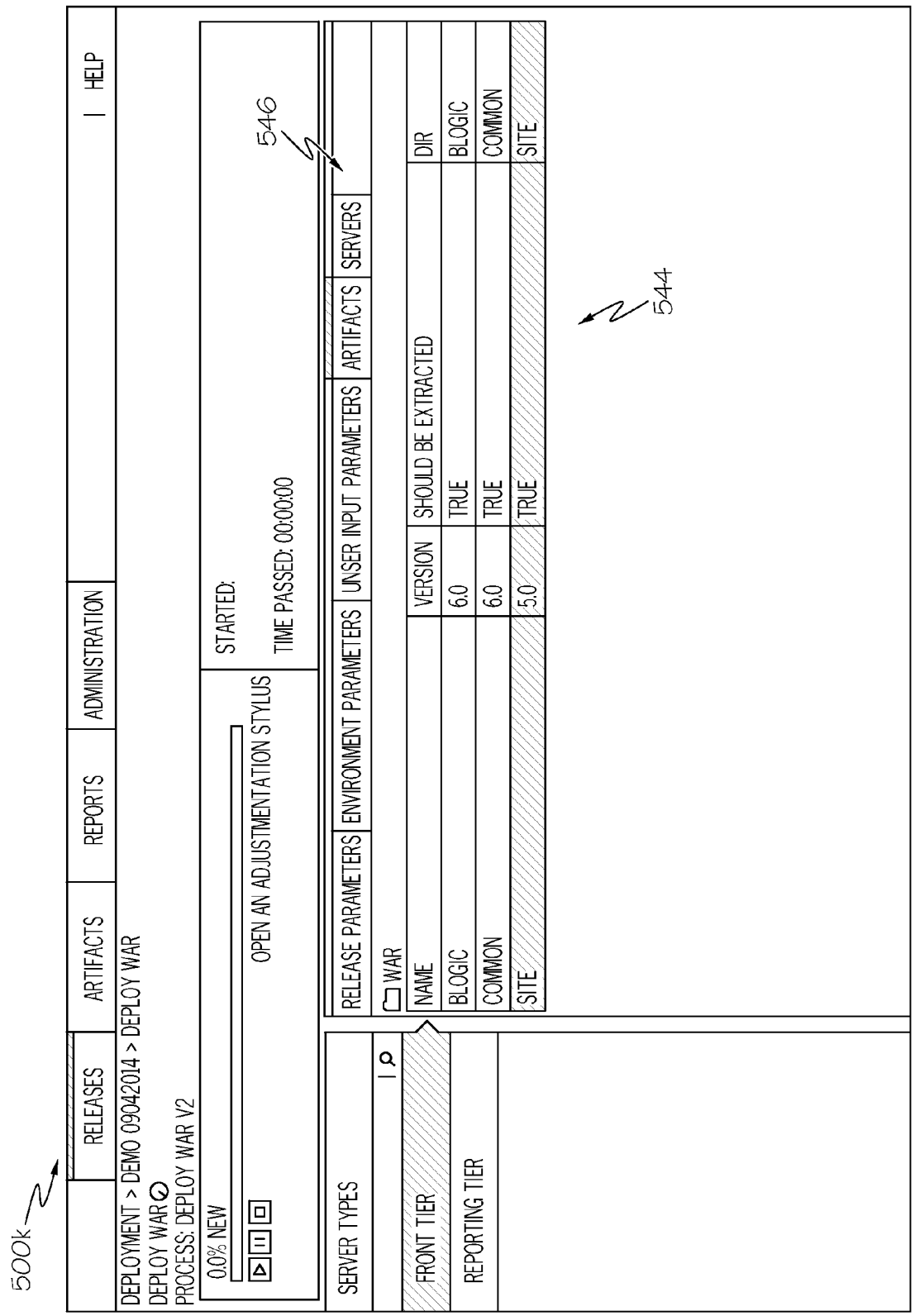

Turning to FIG. 5J, a screenshot 500j is presented showing presentation of an additional pane 542 (e.g., in connection with a user's selection of "Deployment" from menu 541) related to the deployment object. In this example, view 542 can show a listing and progress of each step in the selected deployment logic template. Elements listed in the views (e.g., 534, 536, 538, 540, 542, etc.) can be selectable such that additional views are presented in the GUI to provide additional details concerning the selected element. For instance, a user can select a particular one of the listed steps (e.g., Deploy WAR) to cause a view 544 specific to that step to be presented, as shown in FIG. 5K. In the example of FIG. 5K, a new window 544 is presented that provides information concerning the selected deployment step (e.g., "Deploy WAR"), such as its progress, when the step began being performed by deployment automation logic, as well as a menu 546 providing the user with options to explore more detailed information concerning the selected deployment step and its progress within the automated deployment. For instance, as shown in FIG. 5K, a user has selected "Artifacts" from the menu 546 to cause a listing to be presented in window 544 that shows which artifacts (e.g., WAR files "blogic," "common," and "site") were mapped to the step by the deployment automation system and are going to be used (e.g., deployed) in this particular step. The deployment automation system can perform such a mapping, for instance, by identifying, from the step data corresponding to a given step (e.g., Deploy WAR"), that the step is to use data of a particular type, format, naming convention, source, etc. and can parse the paired-to release data module to identify those artifacts (and artifact information) within the release data module that satisfy the conditions of the step data. The deployment automation engine can formalize the mapping of steps to artifacts and, during the deployment, can identify (without intervention of a user) that performance of a given step will use the one or more corresponding artifacts. Further, the graphical elements corresponding to these artifacts (as displayed in view 544) can also be selectable to cause the presentation of additional views with further details relevant to the deployment of that particular artifact.

Figure 5L:
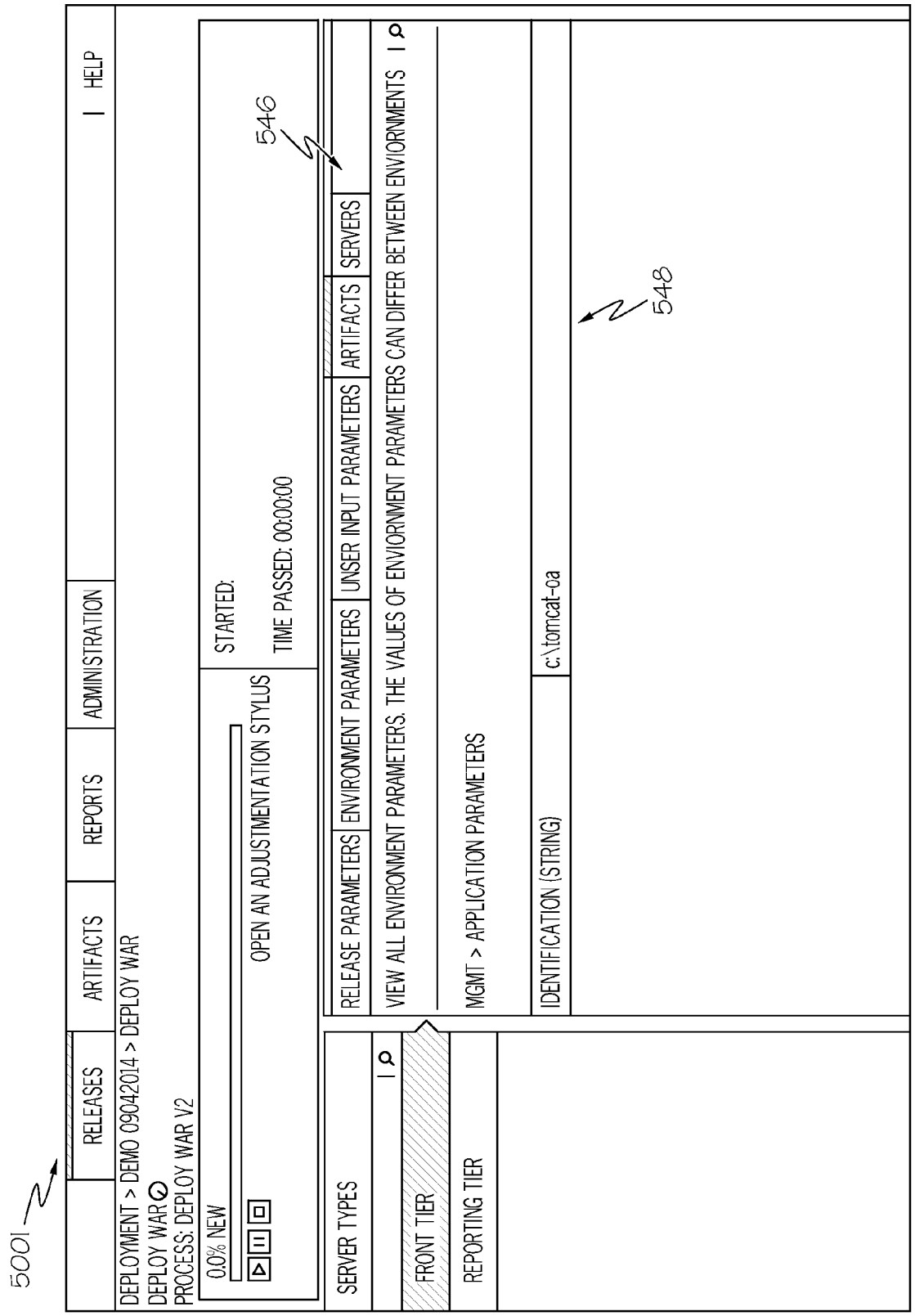

FIG. 5L is a screenshot 500l of another view 548 that can result from a user selecting menu item "Environment Parameters" from menu 546. The view 548 can replace the view 544 of FIG. 5K and can present information concerning the target environment(s) and related configuration parameters the deployment automation engine has determined are relevant to performance of the selected step (e.g., Deploy WAR). For instance, in the particular example of FIG. 5L, deployment automation engine determined (e.g., from corresponding step data) that the Deploy WAR step would involve accessing a Tomcat™ (or other) web server of the target environment. Accordingly, deployment automation engine, when presented with the environmental data module corresponding to the target environment, can parse the environmental data module to identify the environment's web server and the configuration parameters related thereto. In this example, the deployment automation engine mapped the target configuration information specifying the location (or address) of the target's Tomcat™ server to the Deploy WAR step. Further, when deployment is launched, the deployment automation system can read the deployment object and automatically perform actions (using the environment configuration information and according to the step data) to perform the step without further human involvement or intervention.

Figure 6:
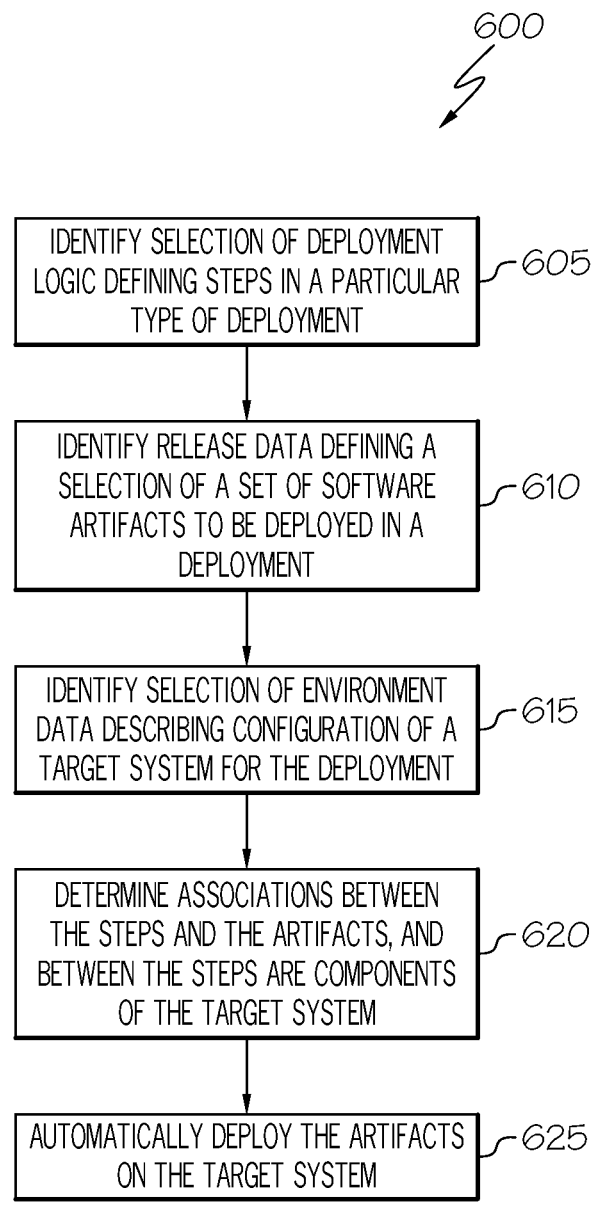
FIG. 6 is a simplified flowchart illustrating example techniques in connection with automated deployment of software on a target system in accordance with at least one embodiment.

Turning to FIG. 6, a simplified flowchart 600 is shown illustrating example techniques involved in an automated deployment of software on a target system. For instance, a selection of deployment logic, such as a deployment logic template or module, can be identified 605. Selection of release data defining a set of artifacts to be deployed in a particular deployment can also be identified 610. In some cases, the deployment logic and release data can be paired to create a deployment plan that can define a generic deployment of the artifacts that can be reused in deploying the artifacts on a number of different target systems. A selection of environment data can be identified 615 corresponding to a particular target system. The environment data can provide configuration information identifying attributes of the components of the target system (e.g., distinct devices and software systems within the target system) that can be used to access (and in some cases authenticate to) each of the components of the target system. Associations can be determined 620 between the steps and the artifacts such that use of each artifact is mapped to a particular step. Further associations can be determined 620 between the steps (and, potentially also, the mapped-to artifacts) and particular component of the target system, such as the components whereon the artifacts are to be deployed using the step. The deployment logic, release data, environment data, and associations there between can be used to automatically deploy the artifacts onto the target system autonomous of further user intervention or interaction. Further, deployment data can be generated to define the deployment and a deployment automation engine can consume the deployment data to perform the automated deployment of the artifacts on the target system, among other example implementations.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
identifying a selection of deployment logic describing a plurality of steps in a type of software deployment;
identifying release data defining a selection of a set of software artifacts to be deployed in a particular deployment;
identifying a selection of environment data describing a set of existing configuration attributes of a target system upon which the set of software artifacts are to be deployed in the particular deployment;
associating, using data processing apparatus, steps in the plurality of steps with software artifacts in the set of software artifacts, wherein a particular one of the plurality of steps is associated with a particular one of the set of artifacts based on a determination that the particular step uses a particular type of artifact and determining that the particular artifact is of the particular type;
associating steps in the plurality of steps with respective configuration attributes in the set of existing configuration attributes of the target system;
generating deployment data describing first associations between the plurality of steps and respective software artifacts and second associations between the plurality of steps and respective configuration attributes, wherein the deployment data defines configuration attributes of the target system to be used in completion of associated steps in the plurality of steps based on the second associations; and
using the deployment data to cause the artifacts to be automatically deployed on the target system based on the first and second associations.

2. The method of claim 1, further comprising generating wherein the deployment data is generated from the selected deployment logic, the selected environment data, the release data, and the first and second associations.

3. The method of claim 1, wherein the selected deployment logic, the selected environment data, and the release data each originate from a different source.

4. The method of claim 1, further comprising generating a deployment plan module from the selected deployment logic and the release data, wherein the deployment plan module identifies each of the plurality of steps and maps each artifact in the set of artifacts to a respective one of the plurality of steps.

5. The method of claim 4, wherein the set of artifacts comprises a plurality of artifacts and a particular one of the plurality of artifacts is mapped to a first one of the plurality of steps and is to be used in the first step, and at least two other artifacts in the plurality of artifacts are mapped to a second one of the plurality of steps and are to be used in the second step.

6. The method of claim 5, wherein generating the deployment data comprises associating the selected environment data to the deployment plan module and mapping the plurality of steps and artifacts to be used in the step to respective components in the target system.

7. The method of claim 6, wherein the components comprise a plurality of computing devices and each of the plurality of computing devices is mapped to a respective step in the plurality of steps.

8. The method of claim 6, wherein the deployment plan module comprises a reusable deployment plan module to be associated with any one of a plurality of environment data modules, each plan environment data module corresponds to a respective computing system, and associating the deployment plan module to environment data causes corresponding deployment data to be generated to define deployment of the artifacts on the respective computing system using the plurality of steps.

9. The method of claim 1, wherein the deployment logic further describes dependencies between the plurality of steps.

10. The method of claim 1, wherein the environment data identifies a set of components of the target system and the configuration attributes comprise a location of each component and information for accessing each component.

11. The method of claim 10, wherein determining the second associations comprises:
identifying that a particular one of the plurality of steps is to deploy a particular one of the set of artifacts on a particular type of system component;
identifying that a particular one of the set of components is of the particular type; and
automatically determining that the particular step is to be used to deploy the particular artifact on the particular component.

12. The method of claim 1, further comprising performing, using data processing apparatus, the deployment of the artifacts on the target system.

13. The method of claim 1, wherein the particular deployment comprises a deployment of new software.

14. The method of claim 1, wherein the particular deployment comprises deployment of an update to existing software.

15. The method of claim 1, further comprising generating the deployment logic based on selection of the plurality of steps from a library of defined steps.

16. The method of claim 15, wherein each step in the library is associated with respective step logic, and generating the deployment logic comprises:
including the step logic of each of the selected plurality of steps; and
receiving a definition of dependencies between the plurality of steps.

17. A computer program product comprising a non-transitory computer readable storage medium comprising computer readable program code embodied therewith, the computer readable program code comprising:
computer readable program code configured to identify a selection of deployment logic describing a plurality of steps in a type of software deployment;
computer readable program code configured to identify release data defining a selection of a set of software artifacts to be deployed in a particular deployment;
computer readable program code configured to identify a selection of environment data describing a set of existing configuration attributes of a target system upon which the set of software artifacts are to be deployed in the particular deployment;
computer readable program code configured to associate steps in the plurality of steps with software artifacts in the set of software artifacts, wherein a particular one of the plurality of steps is associated with a particular one of the set of artifacts based on a determination that the particular step uses a particular type of artifact and determining that the particular artifact is of the particular type;
computer readable program code configured to associate steps in the plurality of steps with respective configuration attributes in the set of existing configuration attributes of the target system;
computer readable program code configured to generate deployment data describing first associations between the plurality of steps and respective software artifacts and second associations between the plurality of steps and respective configuration attributes, wherein the deployment data defines configuration attributes of the target system to be used in completion of associated steps in the plurality of steps based on the second associations; and
computer readable program code configured to use the deployment data to cause the artifacts to be automatically deployed on the target system based on the first and second associations.

18. A system comprising:
a processor;
a memory element;
a deployment automation engine to:
identify a selection of deployment logic describing a plurality of steps in a type of software deployment;
identify a selection of a set of software artifacts to be deployed in a particular deployment;
identify a selection of environment data describing a set of existing configuration attributes of a target system upon which the set of software artifacts are to be deployed in the particular deployment;
associate steps in the plurality of steps with software artifacts in the set of software artifacts, wherein a particular one of the plurality of steps is associated with a particular one of the set of artifacts based on a determination that the particular step uses a particular type of artifact and determining that the particular artifact is of the particular type;
associate steps in the plurality of steps with respective configuration attributes in the set of existing configuration attributes of the target system;
generate deployment data describing first associations between the plurality of steps and respective software artifacts and second associations between the plurality of steps and respective configuration attributes, wherein the deployment data defines configuration attributes of the target system to be used in completion of associated steps in the plurality of steps based on the second associations; and use the deployment data to automatically deploy the artifacts on the target system based on the first and second associations.

\* \* \* \* \*